(12) United States Patent
Lee et al.

US008416533B2

(10) Patent No.: US 8,416,533 B2
(45) Date of Patent: Apr. 9, 2013

(54) ACTUATOR LATCH APPARATUS

(75) Inventors: Hyung-jun Lee, Suwon-si (KR);
Byoung-you Choi, Suwon-si (KR);
Dong-wook Kim, Seoul (KR); Ki-tag Jeong, Hwaseong-si (KR)

(73) Assignee: Seagate Technology International

( * ) Notice: Subject to any disclaimer, the term of this patent is extended or adjusted under 35 U.S.C. 154(b) by 114 days.

(21) Appl. No.: 12/985,586

(22) Filed: Jan. 6, 2011

(65) Prior Publication Data

US 2011/0194210 A1 Aug. 11, 2011

(30) Foreign Application Priority Data

Jan. 6, 2010 (KR) .................. 10-2010-0000907

(51) Int. Cl.
*G11B 5/54* (2006.01)

(52) U.S. Cl. .................. 360/256.2; 360/256.6

(58) Field of Classification Search .............. 360/256.2, 360/256.4, 256.6
See application file for complete search history.

(56) References Cited

U.S. PATENT DOCUMENTS

| | | | |
|---|---|---|---|
| 7,564,654 B2 * | 7/2009 | Kim et al. .................. | 360/256.4 |
| 8,159,787 B2 * | 4/2012 | Choi et al. ................. | 360/256.2 |
| 8,159,788 B2 * | 4/2012 | Kim et al. .................. | 360/256.5 |
| 2007/0146937 A1 * | 6/2007 | Akama et al. .............. | 360/256.4 |
| 2011/0194210 A1 * | 8/2011 | Lee et al. ................... | 360/256.2 |

FOREIGN PATENT DOCUMENTS

| | | |
|---|---|---|
| JP | 2003-051165 | 2/2003 |
| JP | 2005-078710 | 3/2005 |
| JP | 2005-346794 | 12/2005 |
| KR | 100843237 | 6/2008 |

* cited by examiner

*Primary Examiner* — Brian Miller

(57) ABSTRACT

Provided are an actuator latch apparatus and a hard disk drive (HDD) having the actuator latch apparatus. The HDD includes a spindle motor, a data storage disk which is installed on the spindle motor, an actuator which moves a read/write head to a desired position above the data storage disk, and the actuator latch apparatus which locks the actuator in a parking position. The actuator latch apparatus includes a notch which is formed at a rear end of a swing arm and a latch lever which is combined with and pivots on a pivot shaft installed on a base. A retractor member is installed on one of upper and lower surfaces of a counterbalance which is adjacent to a magnet, wherein the counterbalance is formed at a rear end of the latch lever. When the read/write head operates, the latch lever contacts an upper yoke or the base due to a vertical component force of a magnetic force working from the magnet to the retractor member, thereby liming a vertical vibration of the latch lever.

14 Claims, 8 Drawing Sheets

ACTUATOR LATCH APPARATUS

CROSS-REFERENCE TO RELATED APPLICATIONS

This application claims the benefit of priority under 35 U.S.C. §119 to Korean Patent Application No. 10-2010-0000907, filed on Jan. 6, 2010, in the Korean Intellectual Property Office, the disclosure of which is incorporated herein in its entirety by reference.

BACKGROUND

A hard disk drive (HDD), which is one kind of information storage device, is an apparatus which writes data to and/or reads data from a disk using a read/write head. In such an HDD, a read/write head lifts up to a predetermined height from a recoding surface of a disk which is rotating, moves to a desired position by the movement of an actuator, and perform its function.

In such a conventional HDD, when a disk stops rotating, a read/write head is parked in a position in which the read/write head has been taken out of a recoding surface of the disk so that the read/write head does not crash into the recoding surface. When the read/write head is parked in a parking zone of the disk or at a ramp, an actuator may arbitrarily pivot due to an external impact or vibration applied to the conventional HDD. Thus, the read/write head may get out of the parking position and move to the recording surface of the disk. In this case, the read/write head may contact the recording surface of the disk, thereby damaging the read/write head or the recording surface of the disk. Therefore, when the disk stops rotating and thus the read/write head is parked in the parking position, the actuator is locked in the parking position so that the actuator does not arbitrarily pivot. For this purpose, the conventional HDD includes various types of actuator latch apparatuses. For example, general actuator latch apparatuses include an inertial latch apparatus which uses a latch lever which pivots due to inertia.

The latch lever of the inertial latch apparatus is combined with and pivots on a pivot shaft which is installed at a base of the conventional HDD. However, when the latch lever is combined with the pivot shaft, the latch lever has a freedom to move in a vertical direction. Thus, the latch lever vibrates in the vertical direction due to an impact or a vibration. If the conventional HDD is operating, i.e., the read/write head is positioned above the recording surface of the disk which is rotating, and an impact is applied to the conventional HDD, the latch lever vibrates in the vertical direction and thus crashes into the base. When the impact is applied to the base due to this crash, the impact is transmitted to the actuator through the base, and the read/write head installed at the actuator is affected by the impact. Accordingly, the read/write head fails to write data to a desired track of the disk but writes data to another adjacent track. In other words, performance of the read/write head is deteriorated.

SUMMARY

The inventive concept provides an actuator latch apparatus for limiting a vertical vibration of a latch lever occurring when a read/write head operates and a hard disk drive (HDD) having the actuator latch apparatus.

Additional aspects and utilities of the present general inventive concept will be set forth in part in the description which follows and, in part, will be obvious from the description, or may be learned by practice of the present general inventive concept.

Features and/or utilities of the present general inventive concept may be realized by an actuator latch apparatus of hard disk drive (HDD) to lock an actuator in a parking position, wherein the actuator includes a swing arm which moves a read/write head to a desired position above a disk and is installed and pivots on a base, a voice coil motor (VCM) which is combined with a rear end of the swing arm, upper and lower yokes which are respectively disposed over and below the VCM coil, and a magnet which is attached onto at least one of the upper and lower yokes. The actuator latch apparatus may include a notch which is formed at the rear end of the swing arm, a latch lever which is combined with and pivots on a pivot shaft which is installed on the base, and includes a hook which is formed at a front end of the latch lever and interferes with the notch and a counterbalance which is formed at a rear end of the latch lever, and a retractor member, or magnetic member, which is installed on one of upper and lower surfaces of the counterbalance which is adjacent to the magnet. When the read/write head operates, the latch lever may contact one of the upper yoke and the base due to a vertical component force of a magnetic force working from the magnet to the retractor member, thereby limiting a vertical vibration of the latch lever.

The retractor member may have a plate shape.

A protrusion may protrude from a surface of the retractor member and may be inserted into the counterbalance, wherein the retractor member and the protrusion form a T-shaped cross-section.

The magnet may be attached on the lower surface of the upper yoke, and the retractor member may be installed on the upper surface of the counterbalance.

When the read/write head operates, the vertical component force of the magnetic force working on the retractor member may be stronger than weight working on the latch lever. Thus, the latch lever may rise and contact the lower surface of the upper yoke due to the vertical component force of the magnetic force working on the retractor member.

The magnet may be attached onto the upper surface of the lower yoke, and the retractor member may be installed on the lower surface of the counterbalance.

When the read/write head operates, the latch lever may contact the base due to the vertical component force of the magnetic force working on the retractor member.

The magnet may be attached on the lower surface of the upper yoke and the upper surface of the lower yoke.

Features and/or utilities of the present general inventive concept may also be realized by an HDD including a spindle motor which is installed on a base; a data storage disk which is installed on the spindle motor, an actuator which includes a swing arm, a VCM coil, upper and lower yokes, and a magnet. The swing arm may move a read/write head to a desired position above the data storage disk and is installed on the base. The VCM coil may be attached to a rear end of the swing arm, the upper and lower yokes may be respectively disposed over and below the VCM coil, and the magnet may be attached on one of the upper and lower yokes. The HDD may further include an actuator latch apparatus which locks the actuator in a parking position and includes a notch which is formed at the rear end of the swing arm, a latch lever which is mounted to and pivots around a pivot shaft installed on the base. The latch lever may include a hook which is formed at a front end of the latch lever and which interferes with the notch, and a counterbalance which is formed at a rear end of the latch lever. The latch lever may further include a retractor member which is installed on one of upper and lower surfaces of the counterbalance which is adjacent to the magnet.

Features and/or utilities of the present general inventive concept may also be realized by a latch apparatus including a first lever to pivot about a pivot point, the first lever having first and second ends on opposite sides of a first pivot point, a coil located on the first end to generate a magnetic force relative to a magnet opposing the coil to move the first lever with respect to the magnet, and a notch located at the first end, and a second lever having first and second ends on opposite sides of a second pivot point, a hook located on the first end to hook the notch of the first lever, and a magnetic member located on the second end, such that when the coil generates the magnetic force with respect to the magnet to move the first lever with respect to the magnet, the magnetic member is attracted to the magnet, and the second lever rotates about the second pivot point.

The first lever may be a head gimbal assembly.

When the first lever is in a parked position, a weight of the second lever may be greater than a force of magnetic attraction between the magnetic member and the magnet.

A weight of the second lever may be such that, when the latch apparatus is jolted in a direction substantially from the first end of the second lever toward the second end of the second lever, the hook hooks the notch of the first lever.

When the coil generates the magnetic force with respect to the magnet, the magnetic member may move toward the magnet in a direction parallel to a pivot axis of the second lever.

The magnetic member may be a ferromagnetic plate.

The latch apparatus may include a yoke located above each of the first and second levers in a vertical direction parallel to a pivot axis of the first and second levers, the magnet may be mounted to the yoke, and when the coil generates the magnetic force with respect to the magnet, the magnetic member may move upward toward the magnet in a direction parallel to a pivot axis of the second lever and contact the yoke until the coil no longer generates the magnetic force.

The latch apparatus may include a base and a yoke mounted to the base. First and second pivot shafts corresponding to the first and second pivot points may be mounted to the base. The magnet may be mounted to the yoke, and when the coil generates the magnetic force with respect to the magnet, the magnetic member may be pulled toward the base, and the second lever may press against the base until the coil no longer generates the magnetic force.

The latch apparatus may further include an upper yoke located above each of the first and second levers and a lower yoke located below each of the first and second levers. The magnet may include an upper magnet mounted to the upper yoke and a lower magnet mounted to the lower yoke, and when the coil generates the magnetic force with respect to the magnet, the magnetic member may move closer to the upper yoke than the lower yoke.

Features and/or utilities of the present general inventive concept may also be realized by a hard disk drive including a swing arm having a first end including a slider to move over a disk, a second end including a voice coil, and a first pivot shaft located between the first end and the second end, a magnet opposite the voice coil, and a latch apparatus to prevent movement of the swing arm. The latch apparatus may include a first end having a hook to hook a notch located at the second end of the swing arm, a second end having a magnetic member, and a second pivot shaft located between the first and second ends. When a current flows through the voice coil, the voice coil may generate a magnetic force to pivot the swing arm with respect to the magnet, and when the current flows through the voice coil, a magnetic attraction between the magnetic member and the magnet may move the magnetic member towards the magnet to pivot the latch apparatus about the second pivot shaft.

When the hard disk drive is jolted in a direction substantially from the first end of the latch apparatus to the second end of the pivot apparatus, the hook of the latch apparatus may catch the notch of the swing arm.

The hard disk drive may further include a ramp to position the swing arm in a parked position when the swing arm is not performing a read/write operation, and when the swing arm is in the parked position, the second end of the swing arm may contact the second end of the latch apparatus to maintain a distance of the magnetic member from the magnet.

A weight of the latch apparatus may be such that, when notch of the swing arm is jolted in a direction substantially from the second end of the latch apparatus toward the first end of the latch apparatus, the hook of the latch apparatus hooks the notch of the swing arm.

When the coil generates the magnetic force with respect to the magnet, the magnetic member may move toward the magnet in a direction parallel to a pivot axis of the latch apparatus.

The hard disk drive may further include an upper yoke located above the latch apparatus and the second end of the swing arm, the magnet may be mounted to the upper yoke, and when the coil generates the magnetic force with respect to the magnet, the latch apparatus may move to contact the upper yoke and press against the upper yoke until the coil no longer generates the magnetic force.

The hard disk drive may further include a lower yoke located below the latch apparatus and the second end of the swing arm, the magnet may include a first magnet mounted to the upper yoke and a second magnet mounted to the lower yoke, and when the coil generates the magnetic force with respect to the first and second magnets, the second end of the latch apparatus may move closer to the first magnet than the second magnet.

Features and/or utilities of the present general inventive concept may also be realized by a computing device including a hard disk drive to store data and a controller to control operations to read data from and write data to the hard disk drive. The hard disk drive may include a swing arm having a first end including a slider to move over a disk, a second end including a voice coil, and a first pivot shaft located between the first end and the second end, a magnet opposite the voice coil, and a latch apparatus to prevent movement of the swing arm, the latch apparatus including a first end having a hook to hook a notch located at the second end of the swing arm, a second end having a magnetic member, and a second pivot shaft located between the first and second ends. When a current flows through the voice coil, the voice coil may generate a magnetic force to move with respect to the magnet, and when the current flows through the voice coil, a magnetic attraction between the magnetic member and the magnet may move the magnetic member towards the magnet to pivot the latch apparatus about the second pivot shaft.

BRIEF DESCRIPTION OF THE DRAWINGS

Exemplary embodiments of the present general inventive concept will be more clearly understood from the following detailed description taken in conjunction with the accompanying drawings in which.

DETAILED DESCRIPTION OF THE EMBODIMENTS

Figure 1:
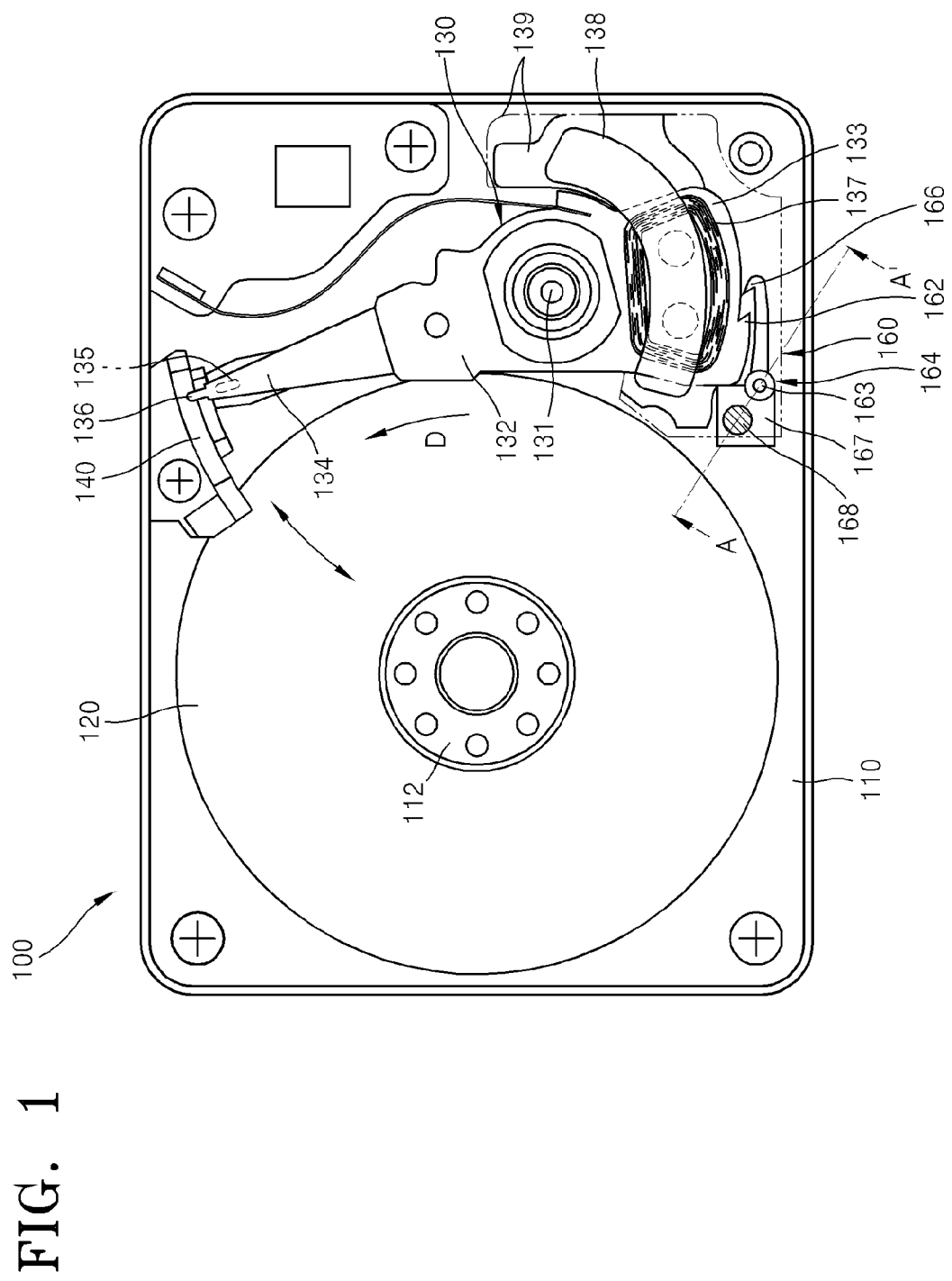
FIG. 1 is a plan view of a hard disk drive (HDD) including an actuator latch apparatus according to an embodiment of the present general inventive concept.

An actuator latch apparatus and a hard disk drive (HDD) according to embodiments of the inventive concept will now be described with reference to the attached drawings. Like reference numerals in the drawings denote like elements. The embodiments are described below in order to explain the present general inventive concept by referring to the figures.

Figure 2:
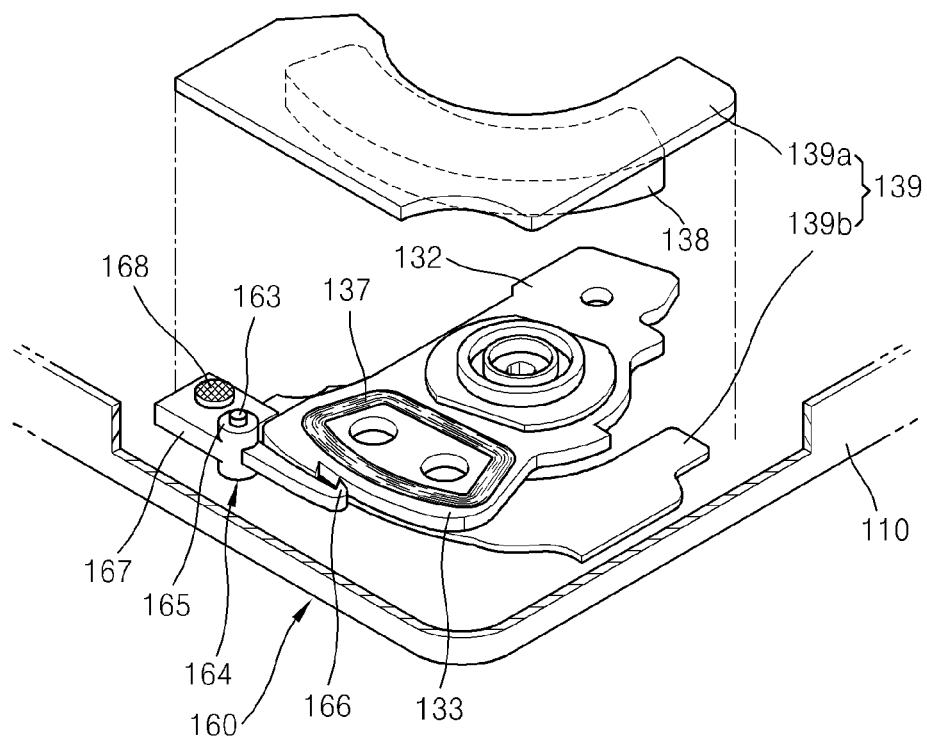
FIG. 2 is a perspective view of the actuator latch apparatus of FIG. 1.

FIG. 1 is a plan view of an HDD including an actuator latch apparatus according to an embodiment of the present general inventive concept, and FIG. 2 is a perspective view of the actuator latch apparatus of FIG. 1.

Referring to FIGS. 1 and 2, an HDD 100 includes a spindle motor 112, at least one data storage disk 120, an actuator or rotation arm 130, and an actuator latch apparatus 160. The spindle motor 112 is installed on a base 110, and the data storage disk 120 is installed on and rotates on the spindle motor 112. The actuator 130 moves a read/write head to write data to and read data from a predetermined position above the data storage disk 120. The actuator latch apparatus 160 locks the actuator 130 in a parking position when the data storage disk 120 stops rotating.

The actuator or rotation arm 130 includes a swing arm 132, a head gimbal assembly 134, and a voice coil motor (VCM). The swing arm 132 is combined with and pivots on an actuator pivot 131 which is installed on the base 110. The head gimbal assembly 134 is installed at an end of the swing arm 132 and supports a slider 135 including a read/write head to elastically bias the slider 135 toward a surface of the data storage disk 120. The VCM pivots the swing arm 132.

The VCM includes a VCM coil 137 which is attached to a rear end of the swing arm 132 and a magnet 138 which faces the VCM coil 137. In more detail, a coil support 133 is formed of a plastic molded material at the rear end of the swing arm 132, and the VCM coil 137 is attached to the coil support 133. The magnet 138 is attached to and supported by a yoke 139 which is installed on the base 110. The yoke 139 includes an upper yoke 139a which is disposed over the VCM coil 137 and a lower yoke 139b which is disposed below the VCM coil 137. The magnet 138 is attached onto a lower surface of the upper yoke 139a. The magnet 138 may be attached onto an upper surface of the lower yoke 139b or may be attached onto the lower surface of the upper yoke 139a and the upper surface of the lower yoke 139b.

The VCM is controlled by a servo control system and pivots the swing arm 132 of the actuator 130 in a direction complying with the Fleming's left hand rule due to an interaction between a current input to the VCM coil 137 and a magnetic field formed by the magnet 138. In other words, when the HDD 100 is turned on, and thus the data storage disk 120 starts rotating in a direction D, the VCM pivots the swing arm 132 in a counterclockwise direction to move the read/write head above the data storage disk 120. When the HDD 100 is turned off, and thus the data storage disk 120 stops rotating, the VCM pivots the swing arm 132 in a clockwise direction to take the read/write head out of a recording surface of the data storage disk 120.

The read/write head, which has been taken out of the recording surface of the data storage disk 120, is parked at a ramp 140 which is located to one side of the data storage disk 120. As described above, when the data storage disk 120 stops rotating, the swing arm 132 pivots in the clockwise direction. Thus, an end tap 136, which is formed at the head gimbal assembly 134, contacts the ramp 140 to park the read/write head.

The actuator latch apparatus 160 locks the actuator 130 to keep the read/write head installed at the actuator 130 parked at the ramp 140 when the data storage disk 120 stops rotating. In other words, the actuator latch apparatus 160 prevents the actuator 130 from arbitrarily pivoting due to an external impact or vibration when the data storage disk 120 stops rotating. Thus, the actuator latch apparatus 160 prevents the read/write head from being taken out of the ramp 140 and moving above the recording surface of the data storage disk 120. If the read/write head moves above the recording surface of the data storage disk 120 when the data storage disk 120 stops rotating, the read/write head directly contacts the recording surface of the data storage disk 120, thereby damaging the recording surface of the data storage disk 120 or the read/write head.

The actuator latch apparatus 160 includes a notch 162 which is formed at the coil support 133 installed at the rear end of the swing arm 132 and a latch lever 164 which is installed on the base 110. The coil support 133 is formed of the plastic molded material as described above, and the notch 162 may be formed using injection molding to horizontally protrude from the coil support 133.

The latch lever 164 is attached to and pivots on a pivot shaft 163 which is installed on the base 110. A pivot combining portion 165 is formed in a central part of the latch lever 164, and the pivot shaft 163 is inserted into and attached to the pivot combining portion 165. A hook 166 is formed at a front end of the latch lever 164 and hooked on the notch 162 when the actuator latch apparatus 160 locks the actuator 130. A counterbalance 167 is formed at a rear end of the latch lever 164. A retractor member or magnetic member 168 formed of a magnetic or ferromagnetic material is installed at an upper surface of the counterbalance 167.

If a clockwise or counterclockwise rotation impact is applied to the HDD 100 from an external source, an inertial force works on the latch lever 164 to pivot the latch lever 164 in the counterclockwise or clockwise direction. The hook 166 of the latch lever 164 is hooked on the notch 162 of the swing arm 132 due to the inertial force to prevent the swing arm 132 from arbitrarily pivoting.

In more detail, when the data storage disk 120 stops rotating and thus the read/write head installed at the slider 135 is parked at the ramp 140, the VCM pivots the swing arm 132 on the actuator pivot 131 in the clockwise direction. Here, the coil support 133 formed at the rear end of the swing arm 132 contacts the counterbalance 167 formed at the rear end of the latch lever 164. Thus, the latch lever 164 is pushed by the swing arm 132, which is rotating in the clockwise direction, and thus pivots in the counterclockwise direction. When the read/write head reaches the parking position on the ramp 140, a pivot driving force applied to the swing arm 132 by the VCM is removed, and thus the swing arm 132 stops pivoting, thereby parking the read/write head.

If the clockwise rotation impact is applied to the HDD 100 when the read/write head is parked as described above, the swing arm 132 pivots in the counterclockwise direction due to inertia. However, the latch lever 160 also pivots in the counterclockwise direction due to inertia, and thus the notch 162 of the swing arm 132 rotating in the counterclockwise direction is hooked on the hook 166. Thus, the swing arm 132 does not pivot anymore and is locked.

When the counterclockwise rotation impact is applied to the HDD 100, inertia forces works on the swing arm 132 and the latch lever 164, respectively, to pivot the swing arm 132 and the latch lever 164 in the clockwise direction. Here, the rear end of the swing arm 132 contacts the counterbalance 167 of the latch lever 164. Thus, the swing arm 132 and the latch lever 164 interfere with each other and thus pivot in the counterclockwise direction. The notch 162 of the swing arm 132 pivoting in the counterclockwise direction is hooked on the hook 166 of the latch lever 164 pivoting in the counterclockwise direction due to the interference. Thus, the swing arm 132 does not pivot anymore and is locked.

As described above, even when an impact is applied to the HDD 100, the actuator latch apparatus 160 prevents the swing arm 132 from arbitrarily pivoting, thereby keeping the actuator 130 locked and the read/write head parked.

Figure 3:
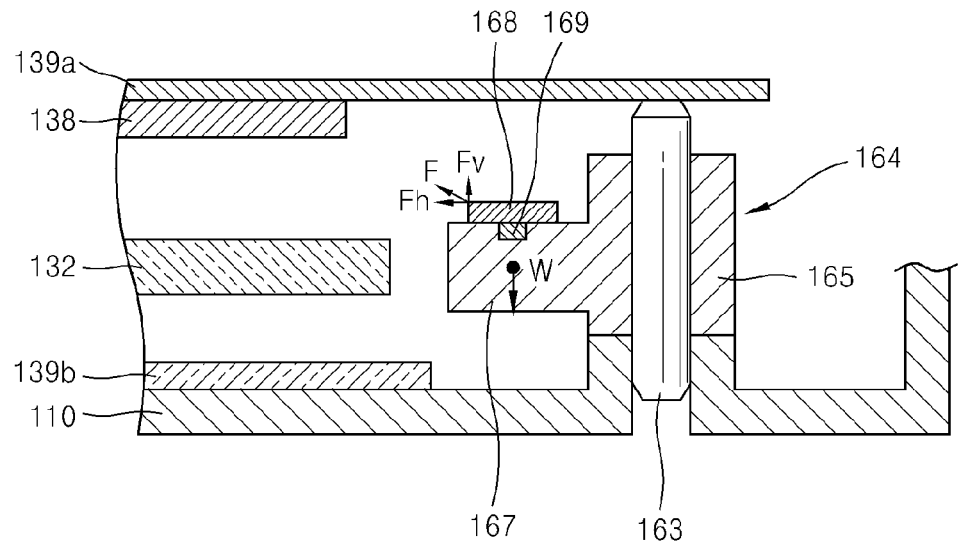
FIG. 3 is a cross-sectional view of the actuator latch apparatus taken along a line A-A of FIG. 1.

FIG. 3 is a cross-sectional view of the actuator latch apparatus 160 taken along a line A-A of FIG. 1.

Referring to FIG. 3, the magnetic member 168 is installed on an upper surface of the counterbalance 167 of the latch lever 164 to be close to the magnet 138 attached on the lower surface of the upper yoke 139a. The retractor member 168 is formed of a magnetic material, e.g., a ferromagnetic steel, and has a wide plate shape so that a magnetic force generated by the magnet 138 sufficiently works on the retractor member 168. The retractor member 168 includes a protrusion 169 which protrudes from a lower surface of the retractor member 168 and is inserted into the counterbalance 167 so that the retractor member 168 is firmly attached to the counterbalance 167. In other words, the retractor member 168 may have a wholly T-shaped cross-section.

When the actuator 130 is locked in the parking position, the latch lever 164 pivots in the counterclockwise direction. Thus, the retractor member 168 keeps distant from the magnet 138. As a result, a magnetic force F, which works on the magnet 138 and the retractor member 168, is not strong, and a horizontal component force Fh and a vertical component force Fv of the magnetic force F are also weak. In particular, the vertical component force Fv of the magnetic force F working on the retractor member 168 is weaker than weight W working on the latch lever 164. Thus, the latch lever 164 keeps contacting the base 110 due to the weight W.

Figure 4:
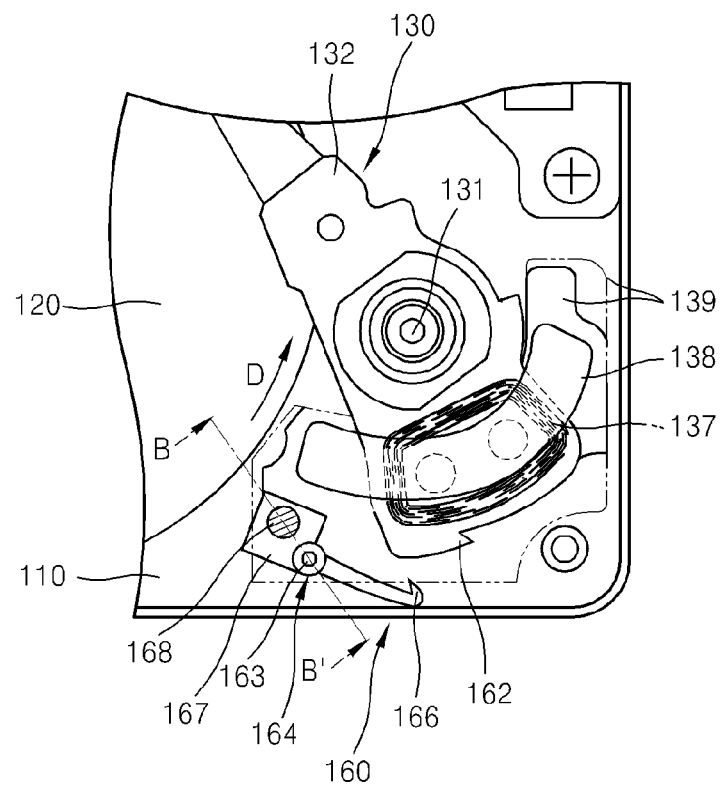
FIG. 4 is a partial plan view for illustrating an operation of the actuator latch apparatus performed when the HDD operates.
Figure 5A:
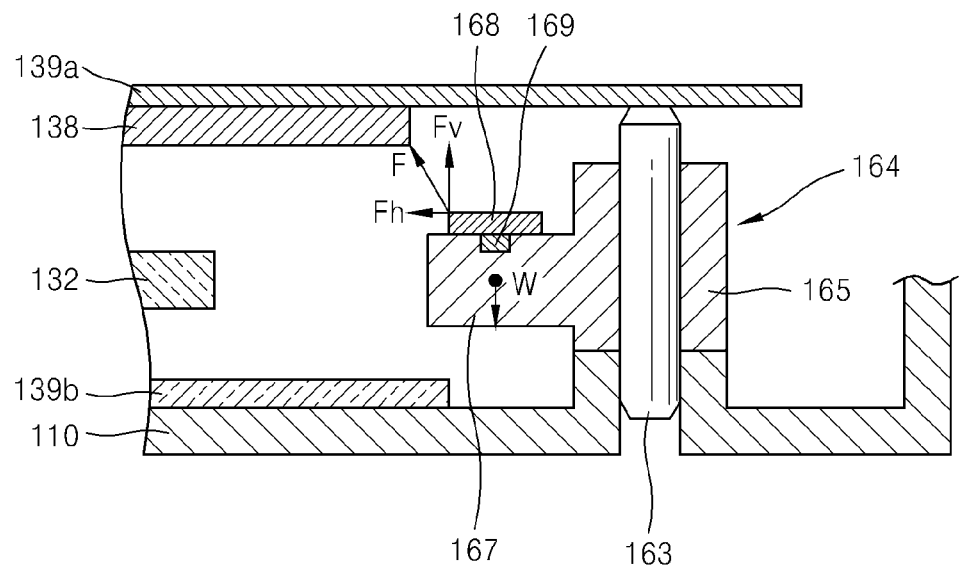
FIGS. 5A and 5B are cross-sectional views of the actuator latch apparatus taken along a line B-B of FIG. 4, for illustrating a rise of a latch lever caused by a magnetic force.
Figure 5B:
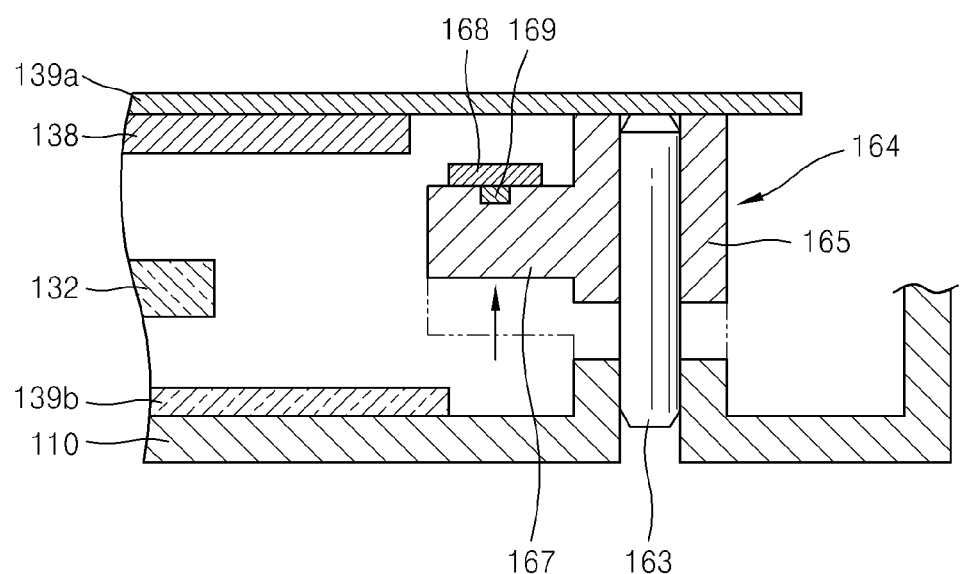

FIG. 4 is a partial plan view for illustrating an operation of the actuator latch apparatus 160 performed when the HDD 100 operates. FIGS. 5A and 5B are cross-sectional views of the actuator latch apparatus 160 taken along a line B-B of FIG. 4, for illustrating a rise of the latch lever 164 caused by a magnetic force.

Referring to FIG. 4, a power source is applied to the VCM coil 137 installed at the rear end of the swing arm 132 to pivot the swing arm 132 in the counterclockwise direction, thereby operating the HDD 100. Simultaneously with this, the latch lever 164 pivots and opens in the clockwise direction due to the horizontal component force Fh of the magnetic force F working between the retractor member 168 and the magnet 138. In other words, the actuator 130 is released from being locked. Thus, the notch 162 of the swing arm 132 pivoting in the counterclockwise direction is not hooked on the hook 166 of the latch lever 164. Therefore, the swing arm 132 continues pivoting in the counterclockwise direction, and the read/write head moves above the surface of the data storage disk 120 which is rotating.

Referring to FIG. 5A, when the latch lever 164 pivots in the counterclockwise direction, the retractor member 168 becomes closer to the magnet 138. Thus, the magnetic force F working on the magnet 138 and the retractor member 168 increases, and a gradient of the magnetic force F increases, thereby increasing the vertical component force Fv of the magnetic force F. If the vertical component force Fv of the magnetic force F working on the retractor member 168 increases more than the weight W working on the latch lever 164, the latch lever 164 rises in a vertical direction. Thus, as shown in FIG. 5B, an upper surface of the pivot combining portion 165 of the latch lever 164 contacts a lower surface of the upper yoke 139a, and a lower surface of the pivot combining portion 165 separates from the base 110 at a predetermined distance.

The hook 166 and the notch 162 may have a thickness such that the hook 166 may contact the notch 162 even when the latch lever 164 is pressed against the upper yoke 139a. Alternatively, the thickness of the hook 166 and the notch 162 may be such that when the latch lever 164 is pressed against the upper yoke 139a, the notch 162 of the swing arm 132 may pass beneath the latch lever 164 without contacting the latch lever 164. According to yet another alternative, the counterbalance 167 may have a thickness greater than the portion of the latch lever 164 including the hook 166, such that the swing arm 132 may pass beneath the portion of the latch lever 164 including the hook 166 without contacting the latch lever. However, the swing arm 132 may continue rotating in the clockwise direction until it contacts the counterbalance 167. When the swing arm 132 presses against the counterbalance 167, it may push the counterbalance 167 away from the magnet 138, such that the magnetic attraction between the magnetic member 168 and the magnet 138 diminishes, and the latch lever 164 falls to the park position closer to the lower yoke 139b.

As described above, when the read/write head is operating, the latch lever 164 firmly contacts the lower surface of the upper yoke 139a due to the magnetic force F. Thus, even if an impact is applied to the HDD 100, a vertical vibration of the latch lever 164 is limited. As a result, a collision between the latch lever 164 and the base 110 is inhibited. In other words, the collision between the latch lever 164 and the base 110 does not occur or even if the collision between the latch lever 164 and the base 110 occurs, an amount of an impact applied to the base 110 is reduced. Therefore, a malfunction of the read/write head caused by the collision is prevented.

Figure 6:
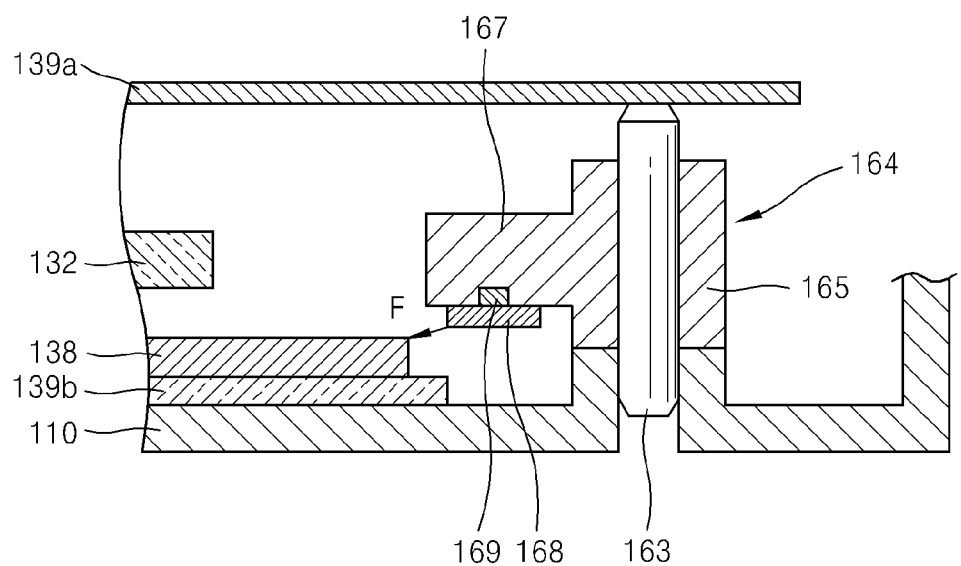
FIG. 6 is a cross-sectional view of an actuator latch apparatus according to another embodiment of the present general inventive concept.

FIG. 6 is a cross-sectional view of an actuator latch apparatus according to another embodiment of the inventive concept.

Referring to FIG. 6, a magnet 138 of a VCM is attached onto an upper surface of a lower yoke 139b not onto a lower surface of an upper yoke 139a. In this case, a retractor member 168 is installed on a lower surface of a counterbalance 167 of a latch lever 164 which is adjacent to the magnet 138. When a read/write head operates and thus the latch lever 164 pivots in a clockwise direction, the retractor member 168 becomes closer to the magnet 138, thereby increasing a vertical component force of a magnetic force F working between the magnet 138 and the retractor member 168. Since the vertical component force of the magnetic force F works downward, a lower surface of a pivot combining portion 165 of the latch lever 164 contacts a base 110.

As described above, when the read/write head is operating, the latch lever 164 firmly contacts the base 110 due to the magnetic force F. Thus, even if an impact is applied to the HDD 100, a vertical vibration of the latch lever 164 is limited. As a result, a collision between the latch lever 164 and the base 110 is inhibited.

Figure 7:
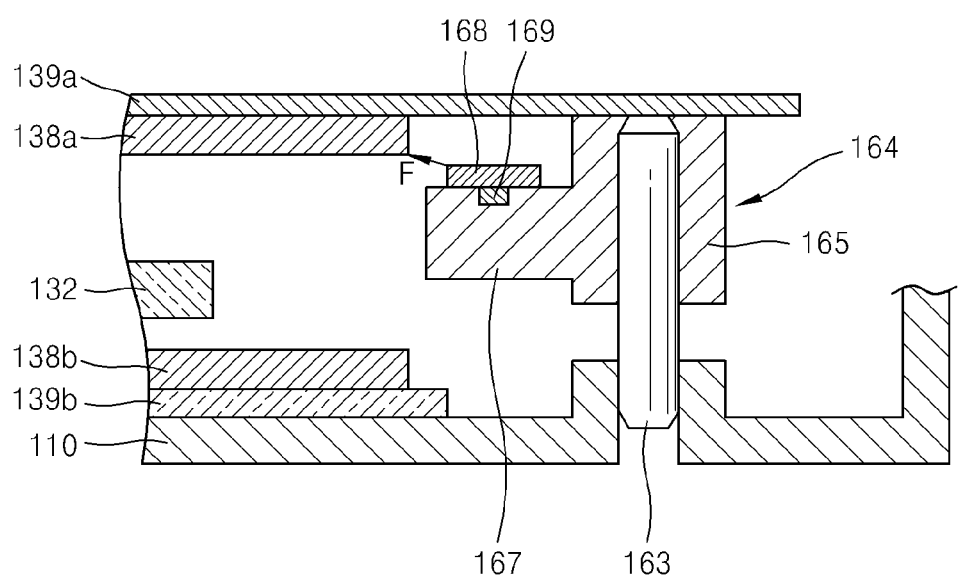
FIG. 7 is a cross-sectional view of an actuator latch apparatus according to another embodiment of the present general inventive concept.

FIG. 7 is a cross-sectional view of an actuator latch apparatus according to another embodiment of the inventive concept.

Referring to FIG. 7, an upper magnet 138a is attached onto a lower surface of an upper yoke 139a, and a lower magnet 138b is attached onto an upper surface of a lower yoke 139b. In this case, a retractor member 168 is installed on an upper surface of a counterbalance 167 of a latch lever 164. When a read/write head operates and the latch lever 164 pivots in a clockwise direction, the retractor member 168 becomes closer to the upper magnet 138a attached onto the lower surface of the upper yoke 139a as described with reference to FIGS. 5A and 5B. Thus, a magnetic force F working between the retractor member 168 and the upper magnet 138a increases.

Since the retractor member 168 is installed on an upper surface of the counterbalance 167 of the latch lever 164 and has a plate shape, a magnetic force between the retractor member 168 and the magnet 138a is very strong, and a magnetic force between the retractor member 168 and the lower magnet 138b is relatively very weak. Thus, a vertical component force of the magnetic force F working on the retractor member 168 pulls the latch lever 164 upward. When a read/write head is operating, the vertical component force of the magnetic force F applied to the latch lever 164 works upward as described above. Thus, an upper surface of a pivot combining portion 165 of the latch lever 164 firmly contacts the lower surface of the upper yoke 139a. As a result, even if an impact is applied to the HDD 100, a vertical sway of the latch lever 164 is limited.

If the upper magnet 138a is attached onto the lower surface of the upper yoke 139a, and the magnet 138b is attached onto the upper surface of the lower yoke 139b, the retractor member 168 is installed on the lower surface of the counterbalance 167 of the latch lever 164 as described with reference to FIG. 6. Since the retractor member 168 is installed on the lower surface of the counterbalance 167 of the latch lever 164 and has the plate shape as described above, a magnetic force between the retractor member 168 and the lower magnet 138b is very strong, and a magnetic force between the retractor member 168 and the upper magnet 138a is relatively very weak. Accordingly, the vertical component force of a magnetic force F working on the retractor member 168 becomes working downward. Thus, the low surface of the pivot combining portion 165 of the latch lever 164 firmly contacts the base 110. As a result, even if the impact is applied to the HDD 100, the vertical sway of the latch lever 164 is limited.

FIGS. 8A-8D further illustrate the latch lever 164 in operation.

Figure 8A:
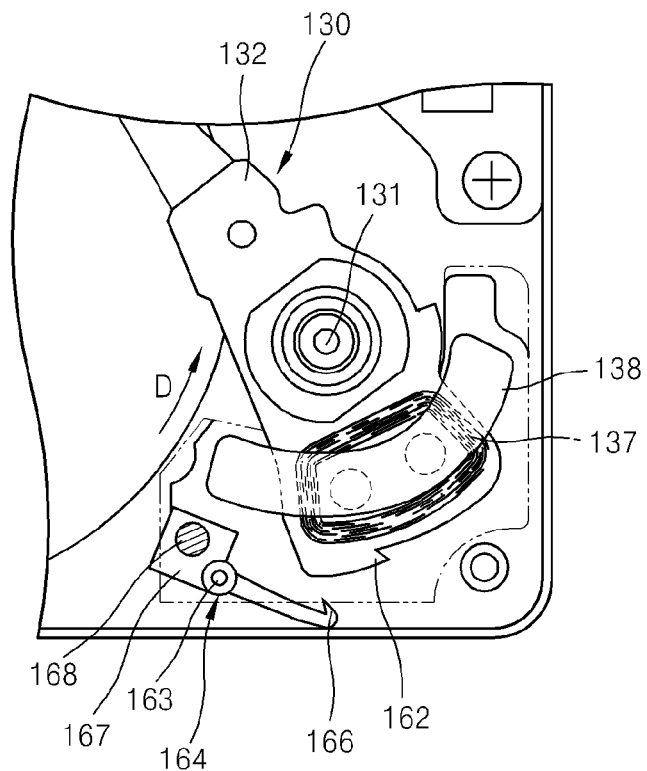
FIGS. 8A to 8D illustrate operation of a latch apparatus according to embodiments of the present general inventive concept.

In FIG. 8A, the disk D is in operation and the actuator or rotation arm 130 has an end positioned over the disk to read data from and/or write data to the disk D. During operation, a controller controls a current supplied to the VCM coil 137 to control a rotation degree of the rotation arm 130 and a location of a slider 135 over the disk D. During operation, the magnetic member 168 of the latch lever 164 is not restrained by the swing arm 132 and so the magnetic member 168 pulls the counterbalance 167 of the latch lever 164 toward the magnet 138. Accordingly, as described above, the hook 166 of the latch lever 164 does not restrain the notch 162 of the swing arm 132. In addition, when the magnet 138 is located on an upper yoke 139a (as illustrated in FIG. 2), the latch lever 164 is pulled upward by the magnetic attraction between the magnetic member 168 and the magnet 138 (as illustrated in FIG. 5B).

Figure 8B:
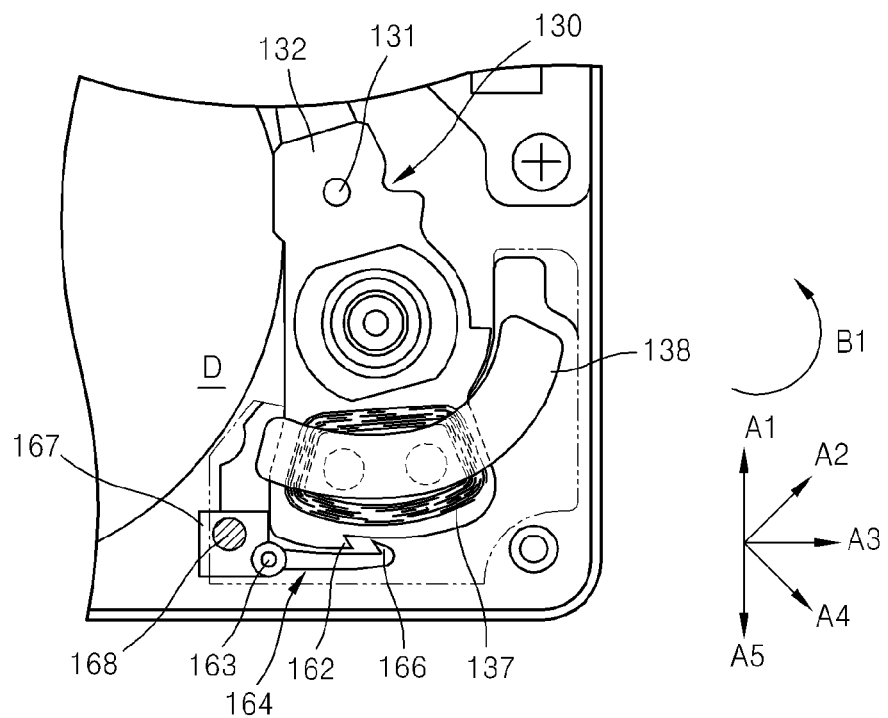

As illustrated in FIG. 8B, when the current supplied to the VCM coil 137 moves the rotation arm 130 to place the rotation arm 130 in a parked position, such that the slider 135 of the swing arm is located on the ramp 140 (as illustrated in FIG. 1), the swing arm 132 presses against the counterbalance 167 of the latch lever 164. Consequently, as the magnetic member 168 is moved farther from the magnet 138, the latch lever 164 moved to a lowered position (as illustrated in FIG. 5A) and the hook 166 is moved nearer to the swing arm 132, and in particular to the notch 162 of the swing arm 132.

If a sudden force or jolt is applied to the HDD in the directions A2, A3, or A4, or in the counter-clockwise direction B1, inertia may cause the swing arm 132 to continue to press against the counterbalance 167 of the latch lever 164. Accordingly, the rotation arm 130 may not move to damage the disk D. A force in the directions A1 or A5 may have a negligible effect on the rotation arm 132, so that the rotation arm 132 is not inclined to move onto the disk D.

Figure 8C:
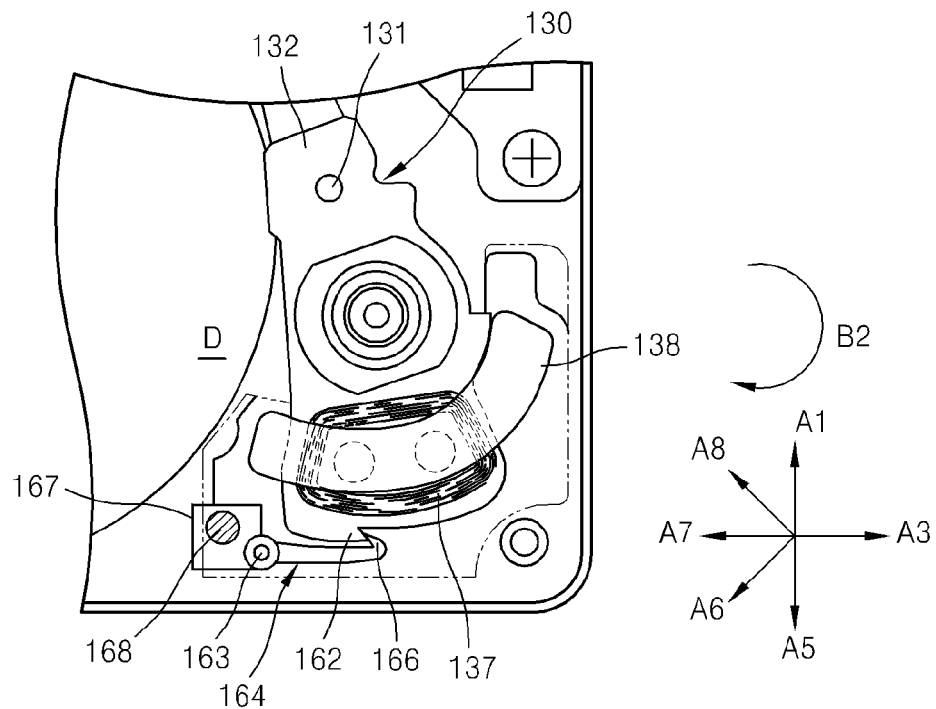

As illustrated in FIG. 8C, when the rotation arm 130 is in the parked state, and a sudden force or jolt is applied in the directions A6, A7, or in the clockwise direction B2, inertia may cause end of the swing arm 132 including the notch 162 to move in a counter-clockwise direction about the actuator pivot 131. In such a case, the inertia may also cause the latch lever 164 to remain in a position adjacent to the swing arm 132 so that the hook 166 catches the notch 162 to prevent the head gimbal assembly 134 of the rotation arm 130 from swinging onto the disk D. In other words, the weight of the latch lever 164 including the counterbalance 167 may be sufficient that when the a jolt or sudden movement causes the rotation arm 130 to rotate in a counter-clockwise direction, the magnetic attraction of the magnetic member 168 to the magnet 138 is not sufficient to move the latch lever 164 to the operation position before the hook 166 hooks the notch 162 of the swing arm 132. The latch lever 164 may remain in a parked position during a jolt or sudden movement of the hard disk drive due to at least one of inertia and the weight of the latch lever 164.

Figure 8D:
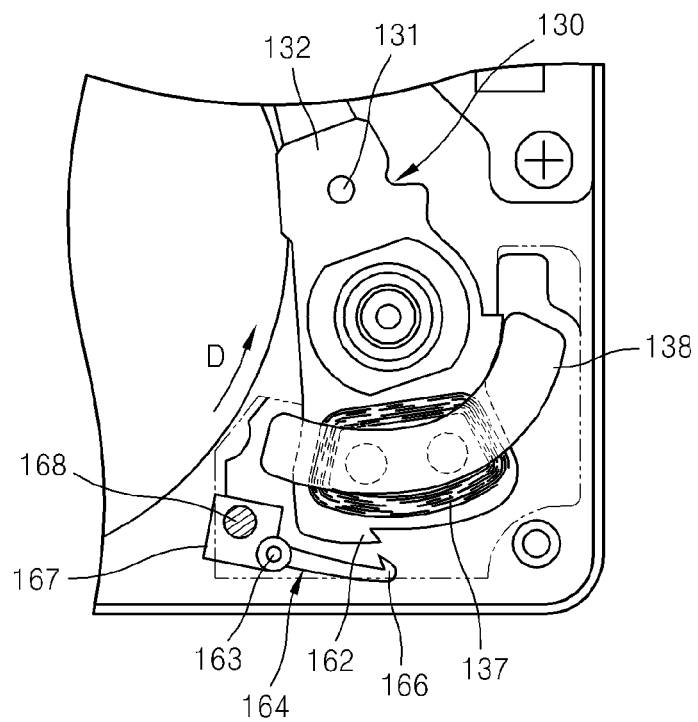

On the other hand, as illustrated in FIG. 8D, when current is applied to the VCM coil 137 to move the rotation arm 130 to an operation position, the controlled movement of the rotation arm gives the magnetic attraction between the magnet 138 and the magnetic member 168 sufficient time to overcome at least one of the inertia and weight of the latch lever 164, and the latch lever 164 may rotate into the operation position in which the hook 166 does not hook the notch 162 of the swing arm 132.

Figure 9:
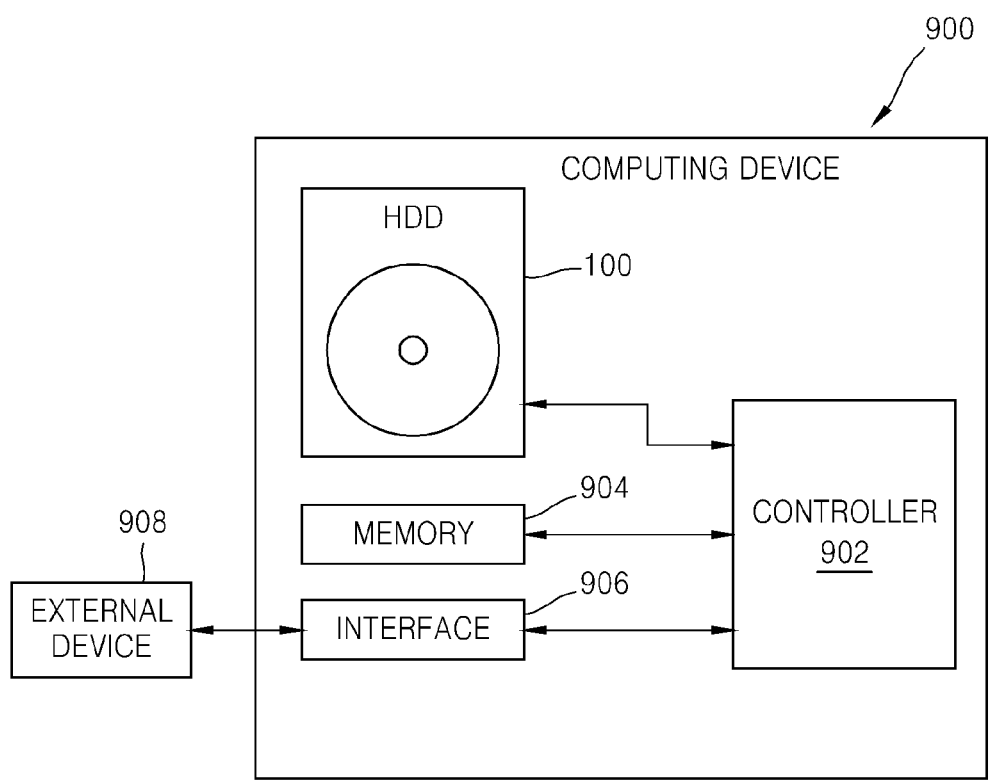
FIG. 9 illustrates a computing device including the hard disk drive of the present general inventive concept.

FIG. 9 illustrates a computing device or a memory device 900 according to an embodiment of the present general inventive concept. The computing device 900 may include a hard disk drive 100, as described in the embodiments of FIGS. 1-8D. The computing device 900 may include additional memory 904 such as RAM, ROM, FLASH memory, other non-volatile memory, cache memory, etc. An interface 906 may allow an external device or a user to provide data and/or commands to a controller 902. The interface 906 may include electrical connections such as USB, Ethernet, serial or parallel data connections, or any other data ports to connect to an external device 908. The interface 906 may also include one or more user data entry devices, such as a keypad, keyboard, touch-screen, knobs, buttons, etc. The interface 906 may also include one or more displays, such as signal lights, screens, LCD displays, etc. The controller 902 may include one or more processors, logic chips, memory, and other circuitry. The controller 902 may control operation of the hard disk drive 100, memory 904, and the interface 906. For example, the controller 902 may receive a command from the interface 906 to transmit data received from one of the interface 906 and the memory 904 to the hard disk drive 100 and may control the write operation to the hard disk drive 100. The hard disk drive 100 may include the latch apparatus 160 described above.

While the inventive concept has been particularly shown and described with reference to exemplary embodiments thereof, it will be understood that various changes in form and details may be made therein without departing from the spirit and scope of the following claims.

What is claimed is:

1. An apparatus comprising:
 a notch located at a second end of a swing arm;
 a latch lever having a first end including a hook to hook the notch, a counterbalance at a second end of the latch lever, and a pivot shaft between the first and second ends of the latch lever, wherein the latch lever is operable to pivot about the pivot shaft; and
 a retractor member attached to one of upper and lower surfaces of the counterbalance adjacent to a magnet, wherein the latch lever is operable to contact one of the upper yoke and a base in response to a vertical component force of a magnetic force working from the magnet to the retractor member, thereby limiting a vertical vibration of the latch lever.

2. The apparatus of claim 1, wherein the retractor member has a plate shape.

3. The apparatus of claim 2, wherein a protrusion protrudes from a surface of the retractor member into the counterbalance, wherein the retractor member and the protrusion form a T-shaped cross-section.

4. The apparatus of claim 1, wherein the magnet is attached on the lower surface of the upper yoke, and the retractor member is on the upper surface of the counterbalance.

5. The apparatus of claim 4, wherein when the read/write head operates, the vertical component force of the magnetic force working on the retractor member is stronger than a weight working on the latch lever.

6. The apparatus of claim 5, wherein when the read/write operates, the latch lever is operable to rise and contact the lower surface of the upper yoke due to the vertical component force of the magnetic force working on the retractor member.

7. The apparatus of claim 1, wherein the magnet is attached onto the upper surface of the lower yoke, and the retractor member is installed on the lower surface of the counterbalance.

8. The apparatus of claim 7, wherein when the read/write head operates, the latch lever is operable to contact the base due to the vertical component force of the magnetic force working on the retractor member.

9. The apparatus of claim 1, wherein the magnet is attached on the lower surface of the upper yoke and the upper surface of the lower yoke.

10. An apparatus comprising:
 a rotation arm having a first end including a slider operable to move over a disk, a second end including a voice coil, and a first pivot shaft located between the first end and the second end;
 a magnet opposite the voice coil;
 a latch apparatus operable to prevent movement of the rotation arm, wherein the latch apparatus includes a first end having a hook operable to hook a notch located at the second end of the rotation arm, a second end having a magnetic member, and a second pivot shaft located between the first and second ends, wherein when a current flows through the voice coil, the voice coil is operable to generate a magnetic force to pivot the rotation arm with respect to the magnet, and when the current flows through the voice coil, a magnetic attraction between the magnetic member and the magnet is operable to move the magnetic member towards the magnet to pivot the latch apparatus about the second pivot shaft, and when the voice coil generates the magnetic force with respect to the magnet, the magnetic member is operable to move toward the magnet in a direction parallel to a pivot axis of the latch apparatus; and
 an upper yoke located above the latch apparatus and the second end of the rotation arm, wherein the magnet is mounted to the upper yoke, and when the coil generates the magnetic force with respect to the magnet, the latch apparatus is operable to move to contact the upper yoke and operable to press against the upper yoke until the coil no longer generates the magnetic force.

11. The apparatus of claim 10, wherein the hook of the latch apparatus is operable to catch the notch of the rotation arm in response to a jolt in a direction substantially from the first end of the latch apparatus to the second end of the latch.

12. The apparatus of claim 10, further comprising a ramp operable to position the rotation arm in a parked position when the rotation arm is not performing a read/write operation, wherein when the rotation arm is in the parked position, the second end of the rotation arm is operable to contact the second end of the latch apparatus to maintain a distance of the magnetic member from the magnet.

13. The apparatus of claim 10, wherein a weight of the latch apparatus is such that, when notch of the rotation arm is jolted in a direction substantially from the second end of the latch apparatus toward the first end of the latch apparatus, the hook of the latch apparatus is operable to hook the notch of the rotation arm.

14. The apparatus of claim 10, further comprising:
 a lower yoke below the latch apparatus and the second end of the rotation arm, wherein the magnet includes a first magnet mounted to the upper yoke and a second magnet mounted to the lower yoke, wherein when the coil generates the magnetic force with respect to the first and second magnets, the second end of the latch apparatus is operable to move closer to the first magnet than the second magnet.

* * * * *